United States Patent [19]
Hendrickson et al.

[11] Patent Number: 5,384,847
[45] Date of Patent: Jan. 24, 1995

[54] METHOD AND APPARATUS FOR PROTECTING CORDLESS TELEPHONE ACCOUNT AUTHENTICATION INFORMATION

[75] Inventors: Alan F. Hendrickson, Austin, Tex.; Bruno Damien, Voisins le Bretonneux, France

[73] Assignee: Advanced Micro Devices, Inc., Sunnyvale, Calif.

[21] Appl. No.: 130,636

[22] Filed: Oct. 1, 1993

[51] Int. Cl.$^6$ .............................................. H04K 1/00
[52] U.S. Cl. .......................................... 380/23; 380/25
[58] Field of Search ....................... 580/21, 23, 24, 25, 580/43, 45

[56] References Cited
U.S. PATENT DOCUMENTS

| | | | |
|---|---|---|---|
| 5,029,207 | 7/1991 | Gammie | 380/23 X |
| 5,077,790 | 12/1991 | D'Amico et al. | 380/23 |
| 5,091,941 | 2/1992 | Needle et al. | 380/43 |
| 5,144,667 | 9/1992 | Pogue, Jr. et al. | 380/25 X |
| 5,150,412 | 9/1992 | Maru | 380/43 |

Primary Examiner—Tod R. Swann
Attorney, Agent, or Firm—Foley & Lardner

[57] ABSTRACT

The present invention provides an apparatus for use in a telecommunication system which includes a local unit such as a cordless telephone handset and a remote unit. The apparatus generates an encrypted confirmation in the local unit in response to an inquiry received from the remote unit. The apparatus comprises receiving means for receiving the inquiry; memory means for storing a scrambled encryption key; descrambling means operatively coupled with the memory means for receiving the scrambled encryption key and for descrambling the scrambled encryption key responsive to a first predetermined digital code to produce a descrambled encryption key; and encryption means for generating an encrypted confirmation in response to the inquiry, the encrypted confirmation being encrypted using the descrambled encryption key. The invention further includes a code means such as a fuse bank for establishing the first predetermined digital code.

23 Claims, 3 Drawing Sheets

METHOD AND APPARATUS FOR PROTECTING CORDLESS TELEPHONE ACCOUNT AUTHENTICATION INFORMATION

BACKGROUND OF THE INVENTION

The present invention relates to a method and apparatus for protecting cordless telephone account authentication information. More particularly, the present invention relates to an apparatus and method for use in a telecommunication system including a local unit and a remote unit wherein the local unit generates an encrypted confirmation responsive to an inquiry received from the remote unit, using account authentication information as an encryption key.

Wireless telephony systems have become increasingly common. In such systems, a subscriber uses a local unit or handset to communicate via radio frequency transmissions with a remote unit, thereby accessing the standard telephone network. Such wireless systems include cellular telephone systems in NorthAmerica and cordless or CT2 systems in Europe and Asia.

Each handset capable of communicating with the remote unit is provided with a unique network identity. This unique identity is used for limiting access to the network to authorized subscribers. This unique identity is also used for subscriber billing and recordkeeping. Thus, the unique identity may be considered to be an account number.

Since access to the wireless telephone network is limited to authorized subscribers, and since the account number is used for billing calls made over the network, there is a substantial need for maintaining the secrecy of the account number. While the account number is unique to a given handset, the account numbers are portable in that a valid account number may be used with any handset. However, the handset must be programmed with the account number.

When a communication such as a telephone call is initiated between the handset and the remote unit, the remote unit transmits a challenge to the handset. This challenge may be in the form of a 32-bit digital random number. The handset has been pre-programmed with the account number and thus stores internally the account number. Upon receiving the transmitted challenge, the handset encrypts a confirmation or response using the stored account number. The confirmation is encrypted in order to maintain secrecy of the account number. A transmitted, unencrypted, confirmation including the account number could be received by an unauthorized party and a different handset programmed with the account number, allowing fraudulent use of the account number.

For example, in the CT2 system, the handset may store a 64-bit digital account number. The handset encrypts the 64-bit account number using the proprietary encryption function "F", using the challenge as the encryption key to produce a 32-bit encrypted confirmation. The handset then transmits the encrypted confirmation to the remote unit. The remote unit compares the received ciphered key with an expected value for the ciphered key. If the values match, the handset and account number are considered to be authorized for the communication transaction to proceed.

The unique account number is stored within the handset at the time the handset is provided to the subscriber and the account is opened between the subscriber and the operator of the wireless telephone network. Therefore, the apparatus which stores the account number must be readily programmable. Moreover, because account numbers may change, the apparatus which stores the account number must be capable of being reprogrammed. Further, as a consumer product, the handset is extremely cost-sensitive. Therefore, it is important that the apparatus for storing the account number and generating the encrypted response be inexpensive.

To reduce the risk of fraud, the account number is preferably stored within a semiconductor device, such as an integrated circuit. To prevent theft of the account number, the account number is never made available at the output pins of the integrated circuit. In operation, the external outputs, such as the pins of the integrated circuit, are electrically isolated to prevent disclosure of the stored account number. If the stored digital account number was ever available at the inputs and outputs of the integrated circuit, the account number would be available for copying and use in another handset.

Prior art techniques of protecting account number information stored within a handset have used non-volatile memory for programming the account number. When a subscriber registers for service with the wireless network operator, the account number has been stored in the non-volatile memory and the memory placed within the handset. The non-volatile memory device operates in conjunction with logic circuitry in encrypting the confirmation in response to a received challenge. In prior art devices, the non-volatile memory device and the logic circuitry have been combined in a single integrated circuit. When the account number is communicated from the non-volatile memory to the logic circuitry, the external output pins have been electrically isolated to prevent external disclosure of the account number.

However, combining non-volatile memory, such as EEPROM or Flash EPROM technology, on the same integrated circuit as logic circuitry, such as in a microcontroller, is very expensive. The semiconductor manufacturing processes capable of providing EEPROM and Flash EPROM are expensive relative to semiconductor manufacturing processes capable of providing logic circuitry only. Also, where the non-volatile memory device and the associated logic circuitry are combined in a single microcontroller, yield reductions due to non-volatile memory programming failures can greatly increase the expense of the finished device. Accordingly, there is a need in the art for an apparatus for generating an encrypted confirmation in a handset which utilizes integrated circuit devices which do not require both non-volatile and logic fabrication processes.

An alternative to the prior art technique of storing an account number in non-volatile memory located in the same integrated circuit device as control logic is storing the account number in a separate non-volatile memory integrated circuit device. In this technique, during the process of encrypting a confirmation in response to a received challenge, the stored account number is communicated from the non-volatile memory device to the control circuit. However, during the time when the stored account number is communicated from one integrated circuit device to another, it is susceptible to copying for fraudulent purposes.

Accordingly, there is a need in the art for an apparatus and a method for generating an encrypted confirmation which does not use a non-volatile memory fabrication process, yet which does not expose the stored account number for copying.

SUMMARY OF THE INVENTION

The present invention provides an apparatus for use in a telecommunication system, the telecommunication system including a local unit and a remote unit, the apparatus generating an encrypted confirmation in the local unit responsive to an inquiry received from the remote unit. The apparatus includes receiving means for receiving the inquiry; memory means for storing a scrambled encryption key; descrambling means operatively coupled with the memory means for receiving the scrambled encryption key from the memory means and for descrambling the scrambled encryption key responsive to a first predetermined digital code to produce a descrambled key; code means operatively coupled with the descrambling means for establishing the first predetermined digital code; encryption means for generating an encrypted confirmation in response to the inquiry, the encrypted confirmation being encrypted using the descrambled encryption key, the encryption means being operatively coupled with the receiving means for receiving the inquiry and the encryption means being operatively coupled with the descrambling means for receiving the descrambled encryption key; and transmitting means operatively coupled with the encryption means for receiving the encrypted confirmation from the encrypted means and transmitting said encrypted confirmation.

The invention further provides a method for use in a telecommunication system, the telecommunication system including a local unit and a remote unit, the method being for generating an encrypted confirmation in the local unit responsive to an inquiry received from the remote unit. The method comprises the steps of providing memory means for storing a scrambled encryption key; receiving the inquiry from the remote unit; receiving the scrambled encryption key from the memory means; descrambling the scrambled encryption key responsive to a predetermined digital code to produce a descrambled encryption key; generating the encrypted confirmation in response to the inquiry, the encrypted confirmation being generated using at least a portion of the inquiry and the descrambled encryption key; and transmitting the encrypted confirmation.

It is, therefore, an advantage of the present invention to provide protection against copying of a stored account number or encryption key while reducing overall system cost by providing an apparatus including an integrated circuit which may be fabricated in an inexpensive semiconductor manufacturing process for fabricating only logic devices, rather than a process for manufacturing both non-volatile memory devices and logic circuitry.

A further advantage of the present invention is to allow an account number or encryption key to be stored in a non-volatile memory device separate from the logic control device of the local unit of a telecommunication system, while maintaining secrecy of the encryption key.

Yet a further advantage of the present invention is to allow information including the stored account number or encryption key stored in the non-volatile memory device to be scrambled so that even copying the contents of the non-volatile memory device does not provide useful account information.

Further advantages and features of the present invention will be apparent from the following specification and claims when considered in connection with the accompanying drawings illustrating the preferred embodiment of the present invention.

DETAILED DESCRIPTION OF THE DRAWINGS

For purposes of clarity and ease in understanding the present invention, like elements will be identified by like reference numerals in the various drawings.

DETAILED DESCRIPTION OF THE INVENTION

Figure 1:
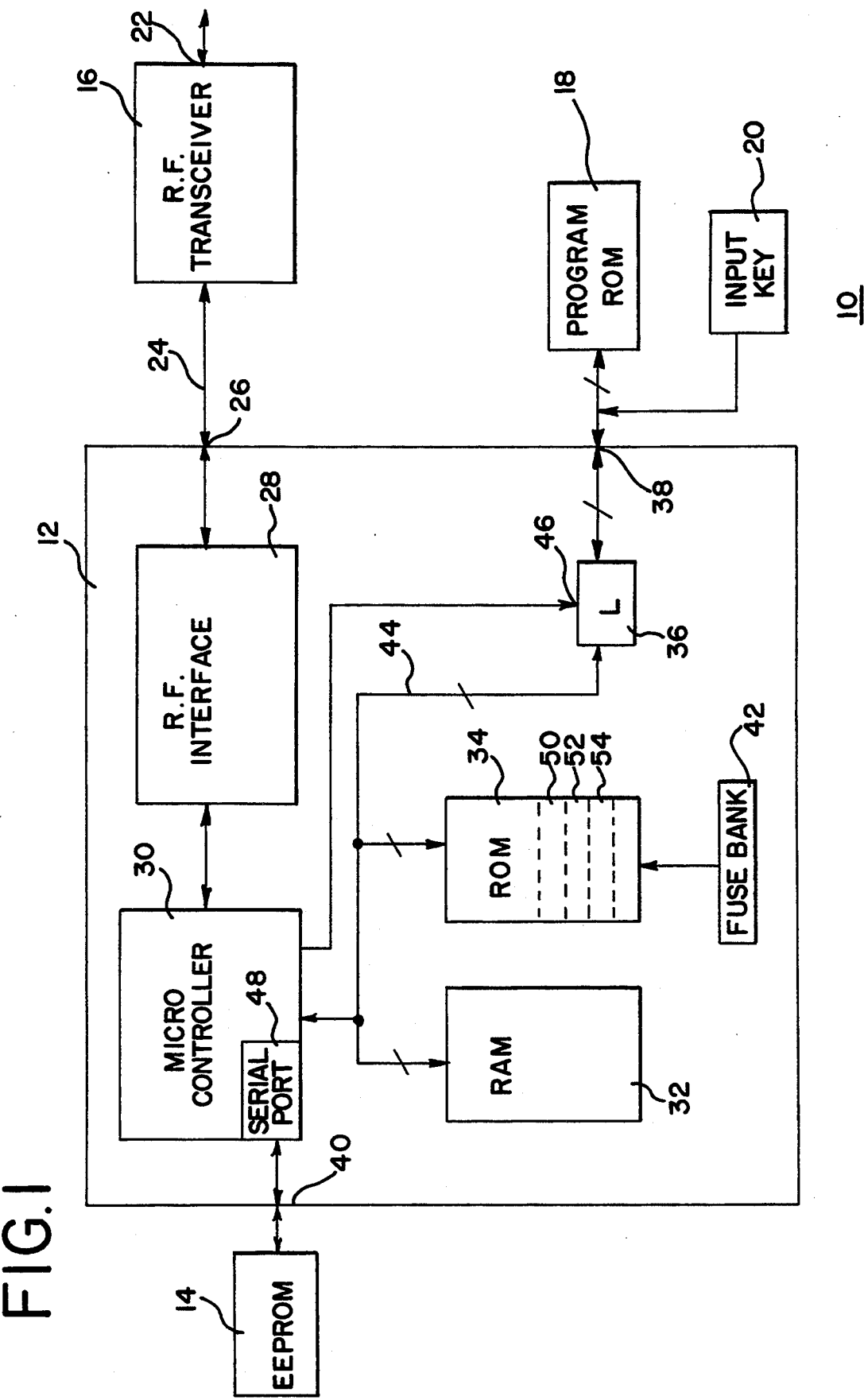
FIG. 1 is a schematic block diagram of the preferred embodiment of the apparatus of the present invention.

FIG. 1 is a schematic block diagram of the preferred embodiment of the present invention. In FIG. 1, an apparatus 10 for generating an encrypted confirmation in a local unit responsive to an inquiry received from a remote unit in a telecommunication system is illustrated as including a controller 12, memory means 14, transceiver 16, program memory 18, and input means 20.

The apparatus 10 may be used in a wireless phone system, such as a phone system having no cord connecting the phone receiver and a base unit, the base unit being configured to receive telephone signals by wire or other means. In such a wireless telephone systems, the base unit communicates using radio frequency transmissions to one or more local units such as a handset.

In a handset employing the apparatus 10, the transceiver 16 includes a port 22 for receiving radio frequency transmissions from the base unit and for transmitting radio frequency transmissions to the base unit. The port 22 may be coupled to an antenna. The transceiver 16 receives radio frequency transmissions at the port 22 and communicates the radio frequency transmissions over a bus 24 to a port 26 of the controller 12. The controller 12 provides at port 26 radio frequency signals for transmission by the transceiver 16 to the base unit. The signals for transmission are conveyed from the port 26 over bus 24 to the transceiver 16, which transmits radio frequency signals at port 22.

The controller 12 includes a radio frequency interface 28, a processing means 30, a random access memory 32, a read-only memory 34, a latch means 36, a parallel port 38, a serial port 40, and a fuse bank 42. The processing means 30, the random access memory 32, the read-only memory 34, and the latch means 36 are coupled by a common bus 44. The latch means 36 includes a control input 46 coupled to the microcontroller 30. Responsive to a signal received from the microcontroller 30 at control input 46, the latch 36 couples the common bus 44 to the parallel port 38.

The processing means 30 includes a serial port means 48 for communicating data with the serial port 40. The memory means 14 is coupled to the serial port 40. The memory means 14 is preferably a non-volatile memory device which may be reprogrammed by the controller 30 but which retains stored data, such as an encryption key or account number, when not supplied with electrical power for operation.

The controller 12 is preferably fabricated in a single integrated circuit. The process for manufacturing the integrated circuit comprising the controller circuit need not, but may, be capable of producing non-volatile memory devices.

In accordance with the present invention, the processing means 30 operates responsive to program instructions for controlling the apparatus 10. The program instructions and the data for operation may be stored in random access memory 32, read-only memory 34, and program memory 18. Thus, the bus 44 forms a bus means for communicating the program instructions and the stored data.

The read-only memory 34 includes a first plurality of program instructions designated in FIG. 1 as descrambling means 50. The read-only memory 34 further includes a second plurality of program instructions designated encryption means 52 and a third plurality of program instructions designated scrambling means 54. Operation of processing means 30 in conjunction with the program instructions forming descrambling means 50, encryption means 52 and scrambling means 54 will be discussed below. The program instructions forming descrambling means 50, encryption means 52 and scrambling means 54 are preferably provided during fabrication of controller 12, as where read-only memory 34 is a one-time-programmable memory or mask programmable memory.

In accordance with the present invention, the apparatus 10 receives an inquiry from a remote unit of the telecommunication system. The inquiry is received by radio frequency transceiver 16 at port 22. The inquiry is conveyed over bus 24 to controller 12, where the inquiry is provided to radio frequency interface 28 for conversion to digital signals. The digital signals forming the inquiry are conveyed to the processing means 30 and stored in random access memory 32.

For performing operations other than those operations controlled by the program instructions forming descrambling means 50, encryption means 52 and scrambling means 54, processing means 30 preferably operates responsive to program instructions located in program memory 18. When operations controlled by the descrambling means 50, the encryption means 52 and the scrambling means 54 are to be performed, program control is transferred to the appropriate location in read-only memory 34. When execution of the appropriate program instructions in read-only memory 34 is completed, program control is transferred back to the program instructions in the program memory 18. Thus, the program memory 18 may contain program instructions customized to the particular subscriber or handset. The read-only memory 34 may contain proprietary program instructions for performing the descrambling, encryption and scrambling functions.

After receipt of a challenge by the apparatus 10, the processing means 30 operates responsive to the program instructions forming the descrambling means 50. The processing means retrieves from the memory means 14 through serial port 40 the preprogrammed scrambled encryption key. The processing means 30 descrambles the scrambled encryption key in response to a predetermined digital code established by the fuse bank 42 to produce a descrambled encryption key which is stored in random access memory 32.

After the scrambled encryption key has been descrambled, the processing means 30 further operates responsive to the program instructions forming the encryption means 52. The processing means 30 retrieves the descrambled encryption key and the inquiry stored in random access memory 32. The processing means 30 generates an encrypted confirmation in response to the inquiry, using the descrambled encryption key. The encryption means may implement the proprietary, industry standard "F" encryption algorithm.

The processing means 30 conveys the encrypted confirmation to the radio frequency interface for conversion to radio frequency signals. The radio frequency signals are conveyed from the controller 12 to the transceiver 16 for transmission to the remote unit.

The input means 20 is provided for conveying the encryption key to the controller 12 during initial programming of the local unit. When a subscriber initiates service, the encryption key, which may be in the form of an account number, is provided to the input means. Thus, the input means receives a clear encryption key, which is not scrambled, at the time of programming. The input means may be an external port for coupling the handset including the apparatus 10 to a programming device for programming the handset with the account number or encryption key.

The input means 20 conveys the clear encryption key to port 38, and the clear encryption key is conveyed over bus 44 to the processing means 30. In response to the plurality of program instructions forming the scrambling means 54 stored in the read-only memory 34, the processing means 30 scrambles the clear encryption key to produce a scrambled encryption key. The scrambled encryption key is conveyed by serial port means 48 to the serial port 40 for storage in the memory means 14. Thus, the second plurality of program instructions 54 forms a scrambling means for receiving the clear encryption key and scrambling the clear encryption key responsive to a second predetermined digital code to generate the scrambled encryption key.

It is an advantage of the present invention that once the scrambled encryption key has been stored in the memory means 14 during initial programming, the encryption key is never available in descrambled or clear form at external outputs of the controller 12, such as parallel port 38. It is a further advantage of the present invention that the program instructions which form the descrambling means 50, the encryption means 52 and the scrambling means 54 are never available at external outputs of the controller 12. In accordance with the present invention, whenever the common bus 44 communicates the scrambled encryption key or the program instructions forming the descrambling means 50, the encryption means 52 or the scrambling means 54, the latch means 36 decouples the common bus 44 from the parallel port 38. In this manner, program instructions and data such as the descrambled encryption key which are communicated on the common bus 44 are not available at external outputs of the controller 12.

It is a further key advantage of the present invention that the scrambled encryption key stored in the memory means 14 is maintained in scrambled form. Since the encryption key is scrambled, copying the contents of the memory means 14 does not provide useful account information. The scrambled encryption key stored in the memory means 14 can only be descrambled to produce a descrambled encryption key in response to the first predetermined digital code established by the fuse bank 42.

The fuse bank 42 preferably comprises a plurality of fuses programmed at the time of fabrication of the controller 12. As is known in the art, the fuses which form the fuse bank 42 may comprise regions of low-resistance conductor such as metal or polysilicon. At the time of programming, a predetermined, unique, combination of fuses is programmed by converting the fuses from a low-resistance state to a high-resistance state. The programmed fuses establish a code of, for example 32 bits, permitting up to $2^{32}$ possible predetermined digital codes for producing the descrambled encryption key by the scrambling means. Because of the large number of possible codes, the predetermined digital code is virtually unique.

In accordance with the present invention, the descrambling means 50 and the scrambling means 54 preferably operate responsive to the same predetermined digital code established by the fuse bank 42. Use of the same predetermined digital code as both a scrambling and a descrambling key for the encryption key allows the descrambling and scrambling functions to operate transparently. That is, the actual value of the key is arbitrary and need not be disclosed. Thus, the predetermined digital code may be programmed once at the initial manufacturing stage and need never be made available external to the controller 12.

Figure 2:
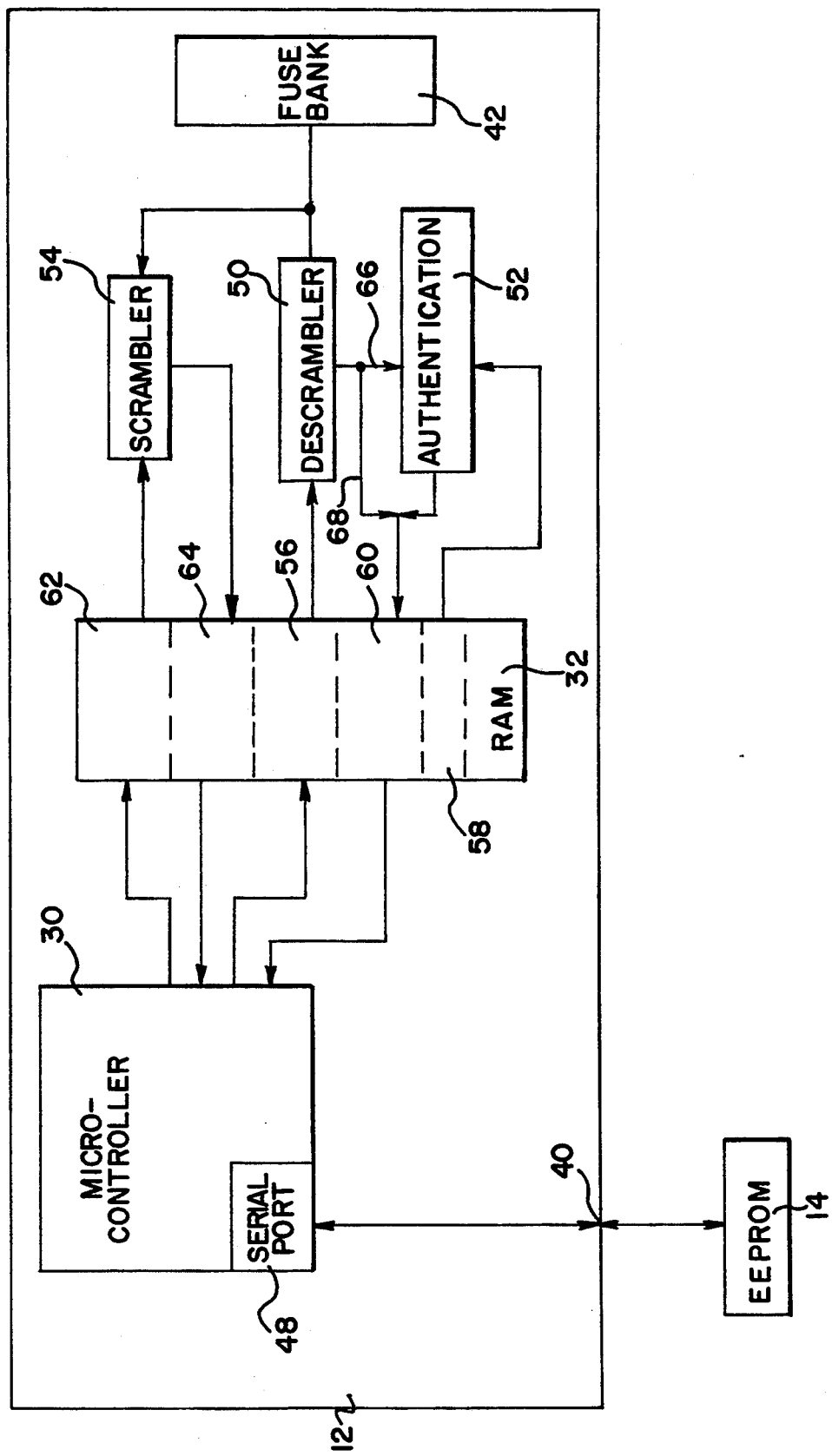
FIG. 2 is a schematic block diagram showing operational features of a portion of the preferred embodiment of the apparatus of the present invention.

Referring now to FIG. 2, it is a schematic block diagram showing operational features of the preferred embodiment of the present invention. FIG. 2 illustrates the controller 12 coupled to the memory means 14 at serial port 40. The processing means 30 is coupled to the serial port 40 by serial port means 48. The processing means 30 is operatively coupled with the random access memory 32. The processing means 30 is further operatively coupled with scrambling means 54, descrambling means 50, and authentication means 52, which may be program instructions contained in memory such as read-only memory 34 (FIG. 1). The fuse bank 42 is operatively coupled with the scrambling means 54 and the descrambling means 50.

In operation, the processing means 30 operates responsive to stored program instructions to move a scrambled encryption key from the memory means 14 to a predetermined location 56 in the random access memory 32. Responsive to program instructions forming descrambling means 50, the processing means 30 provides a signal to the control input 46 of the latch means 36 (FIG. 1) to decouple the common bus 44 from the output port 38. Thus, all bus transactions involving the common bus 44 are not externally visible during operation of the program instructions forming the descrambling means 50. The descrambling means 50 converts the scrambled encryption key to a descrambled encryption key, using the predetermined digital code established by the fuse bank 42 as a descrambling key.

The descrambled encryption key is provided to the encryption means 52. The encryption means 52 receives the challenge transmitted by the remote unit to the local unit or handset and which has been stored in the random access memory 32 at a predetermined location 58. The encryption means 52 encrypts the challenge with the descrambled encryption key and stores the result as an encrypted confirmation in the random access memory at a predetermined storage location 60.

In accordance with the present invention, the authentication algorithm may not apply to all data types to be stored in the memory means 14. For example, initiation of wireless telephony service may require transmission of a handset identification code or a manufacturer identification code, or both, from the handset to the remote unit. These identification codes may be stored in scrambled form in memory means 14 to protect their secrecy, along with the scrambled encryption key. However, these identification codes may be transmitted without encryption. Thus, two paths are illustrated in FIG. 2. A first path 66 indicates flow of data such as the encryption key from the descrambling means 50 to the encryption means 52. A second, bypass path 68 indicates flow of data such as the handset identification code and the manufacturing code from the descrambling means 50 directly to storage in the random access memory 32. The handset identification code and the manufacturer identification code may be provided to the apparatus 10 by the input means 20 (FIG. 1), scrambled by the scrambling means 54, and stored in the memory means 14 in the same manner as the clear encryption key.

The program instructions forming the scrambling means 54 are used for scrambling of the account number or encryption key during initial programming of the controller 12. In operation, the processing means stores in a predetermined location 62 the clear encryption key received from input means 20 over common bus 44. Responsive to program instructions forming scrambling means 54, the processing means conveys a control signal to the control input 46 of the latch means 36 (FIG. 1), decoupling the common bus 44 from the output port 38. Thus, all bus transactions involving common bus 44 during execution of the program instructions forming scrambling means 54 are not externally visible. The scrambling means 54 scrambles the clear encryption key responsive to a second predetermined digital code established by the fuse bank 42. The scrambling means produces a scrambled encryption key and stores the scrambled encryption key in a predetermined location 64 in random access memory 32. Responsive to program instructions forming the scrambling means 54, the processing means 30 sends a control signal to the control input 46 of the latch means 36 to couple to control bus 44 to the output 38. The processing means 30 then reads the scrambled encryption key stored at location 64 in random access memory 32 and conveys the scrambled encryption key to serial port 40 for storage in memory means 14.

Figure 3:
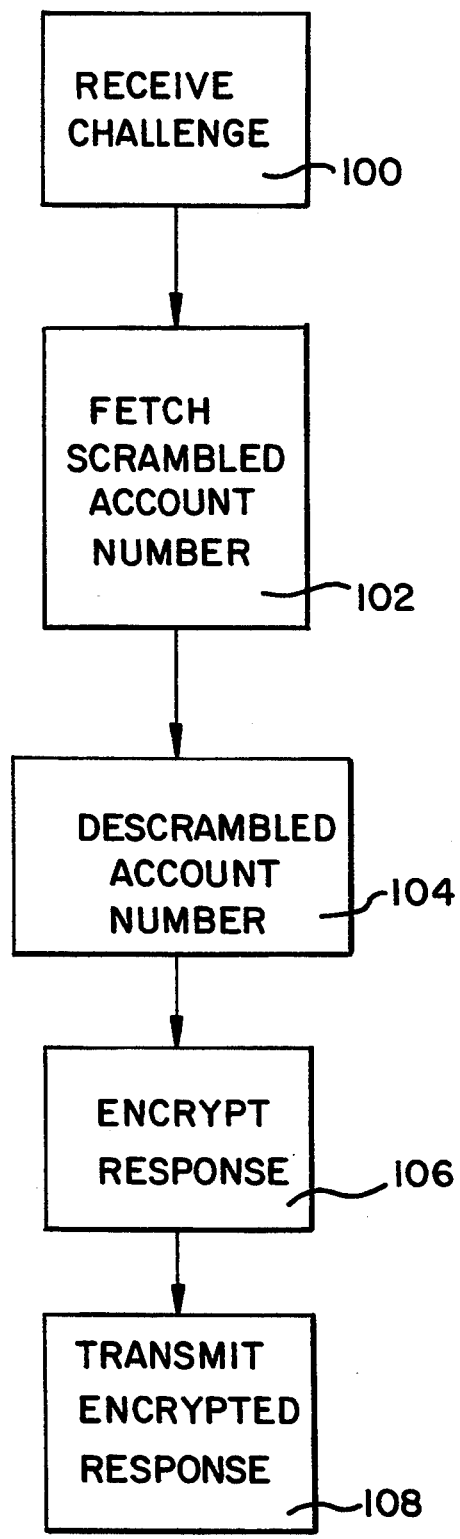
FIG. 3 is a flow diagram illustrating the preferred embodiment of the method of the present invention.

FIG. 3 is a flow diagram illustrating the preferred embodiment of the method of the present invention. FIGS. 3 illustrates a method for use in a telecommunication system which includes a local unit and a remote unit, such as a wireless telephony system. The method illustrated in FIG. 3 is for generating an encrypted confirmation in the local unit, such as a handset, responsive to an inquiry received from the remote unit.

The method begins at step 100, in which the local unit receives the inquiry from the remote unit. The inquiry may be in the form of a challenge, a multiple-bit digital code transmitted by the remote unit and requiring a response from the local unit for authentication and continued communication.

The method continues at step 102, in which the local unit receives a scrambled encryption key which is stored in a memory means. The scrambled encryption key may be a second multiple-bit digital code which has been scrambled according to any descrambling algorithm known in the art. The scrambled encryption key may be an account number unique to the local unit or handset, which has been preassigned to the subscriber or operator of the handset. Such an account number may uniquely identify the subscriber and the handset for purposes of authenticating the use of the handset with the remote unit and for purposes of billing the subscriber for telephony services.

The method continues at step 104, in which the encryption key is descrambled. As noted, descrambling preferably occurs in accordance with any known scrambling and descrambling algorithm. In accordance with the present invention, a predetermined digital code serves as the descrambling key to produce a descrambled encryption key.

The method continues at step 106, in which the encrypted confirmation is generated. The encrypted confirmation may be in the form of an encrypted response to be transmitted from the local unit or handset to the remote unit for authorizing continued communication between the local unit and the remote unit. Preferably, in accordance with the present invention, the encrypted confirmation is generated using at least a portion of the received inquiry and the descrambled encryption key. The method continues at step 108 in which the encrypted confirmation is transmitted to the remote unit.

In accordance with the present invention, the method may further include the step of providing code means for establishing the predetermined digital code. Such code means may be in the form of a fuse bank or group of fuses configured for generating the predetermined digital code. The fuses may be blown or programmed during fabrication to generate the predetermined digital code during operation.

Further in accordance with the present invention, the method may further comprise the steps of receiving a clear encryption key, scrambling the clear encryption key to produce the scrambled encryption key, and storing the scrambled encryption key in the memory means prior to receiving the inquiry. The clear encryption key may be an account number uniquely assigned to the subscriber or the local unit or handset. When an account for wireless telephony services is initiated by the subscriber, the local unit or handset may be programmed with the clear encryption key. Programming, in accordance with the present invention, includes scrambling the clear encryption key to produce the scrambled encryption key and storing the scrambled encryption key in the memory means, such as a non-volatile memory device. Preferably, the clear encryption key is scrambled in response to the predetermined digital code used for descrambling the scrambled encryption key.

Still further in accordance with the present invention, the scrambling and descrambling steps may occur in a first integrated circuit, the memory means being provided in a second integrated circuit coupled to the first integrated circuit. The method may further comprise the step of providing within the first integrated circuit a bus means for communicating the scrambled encryption key and the clear encryption key, and output means, such as bonding pads or package pins, for coupling the bus means to the memory means. Further in accordance with the present invention, the method may further include the step of decoupling the output means from the bus means when the scrambled encryption key is descrambled. Thus, whenever the clear or descrambled encryption key is communicated on the bus means within the first integrated circuit, the bus means is decoupled from the output means, assuring that the descrambled or clear encryption key remains secret and is never disclosed outside the first integrated circuit. Since only the scrambled encryption key is stored in the memory means, copying the memory means including the stored scrambled encryption key is useless and does not allow fraudulent use of the encryption key or account number. Further, since the scrambled encryption key may be descrambled only in accordance with the predetermined digital code, the encryption key for initiating wireless telephony services is secure against copying.

As can be seen from the foregoing, the present invention provides an apparatus and method for detecting cordless telephone account authentication information, such as an account number. The account number is preferably scrambled by a logic circuit contained in a first integrated circuit fabricated using a relatively inexpensive semiconductor fabrication process for logic circuits. The scrambled encryption key is then preferably stored by the logic circuit in an associated non-volatile memory device. Thus, the present invention provides significant cost advantages over prior art account number protection apparatus, which combine logic circuitry and non-volatile memory on a single integrated circuit, requiring a relatively expensive semiconductor fabrication process.

The stored, scrambled encryption key is retrieved from the non-volatile memory device in response to a received inquiry, such as a challenge from a remote unit in a wireless telephony system. The scrambled encryption key is descrambled in accordance with a predetermined digital code and used to encrypt a confirmation or response. The predetermined digital code is preferably generated by a fuse bank or group of fuses configured at the time of fabrication for generating a multiple-bit digital code. Where a large number of fuses are used, a large number of possible digital codes can be generated. Thus, the predetermined digital code necessary for descrambling the scrambled encryption key is virtually unique. Since the scrambled encryption key can only be descrambled in response to the predetermined digital code, a high level of security for the encryption key or account number is provided.

It is to be understood that, while the detailed drawings and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

What is claimed is:

1. An apparatus for use in a telecommunication system, said telecommunication system including a local unit and a remote unit, the apparatus generating an encrypted confirmation in said local unit responsive to an inquiry received from said remote unit; the apparatus comprising:

receiving means for receiving said inquiry;

memory means for storing a scrambled encryption key;

descrambling means operatively coupled with said memory means for receiving said scrambled encryption key from said memory means and for descrambling said scrambled encryption key responsive to a first predetermined digital code to produce a descrambled encryption key;

code means operatively coupled with said descrambling means for establishing said first predetermined digital code;

encryption means for generating an encrypted confirmation in response to said inquiry, said encrypted confirmation being encrypted using said descrambled encryption key, said encryption means being operatively coupled with said receiving means for receiving said inquiry and said encryption means being operatively coupled with said descrambling means for receiving said descrambled encryption key; and transmitting means operatively coupled with said encryption means for receiving said encrypted confirmation from said encryption means and transmitting said encrypted confirmation.

2. An apparatus for confirmation as recited in claim 1 wherein the apparatus use in a telecommunication system, said telecommunication system including a local unit and a remote unit, the apparatus generating an encrypted confirmation in said local unit responsive to an inquiry received from said remote unit; the apparatus comprising:

receiving means for receiving said inquiry;
memory means for storing a scramble encryption key;
descrambling means operatively coupled with said memory means for receiving said scrambled encryption key from said memory means and for descrambling said scrambled encryption key responsive to a first predetermined digital code to produce a descrambled encryption key;
code means operatively coupled with said descrambling means for establishing said first predetermined digital code;
encryption means for generating said encrypted confirmation in response to said inquiry, said encrypted confirmation being encrypted using said descrambled encryption key, said encryption means being operatively coupled with said receiving means for receiving said inquiry and said encryption means being operatively coupled with said descrambling means for receiving said descrambled encryption key;
transmitting means operatively coupled with said encryption means for receiving said encrypted confirmation from said encryption means and transmitting said encrypted confirmation;
input means for receiving a clear encryption key; and
scrambling means operatively coupled with said input means for receiving said clear encryption key from said input means, said scrambling means scrambling said clear encryption key responsive to a second predetermined digital code to generate said scrambled encryption key and wherein said scrambling means is operatively coupled with said memory means for storing said scrambled encryption key in said memory means.

3. An apparatus for generating an encrypted confirmation as recited in claim 2 wherein said code means establishes said second predetermined digital code.

4. An apparatus for generating an encrypted confirmation as recited in claim 3 wherein said first predetermined digital code is the same as said second predetermined digital code.

5. An apparatus for generating an encrypted confirmation as recited in claim 3 wherein the apparatus further comprises storage means for storing scrambled data for transmission, said descrambling means being operatively coupled with said storage means for receiving said scrambled data and for descrambling said scrambled data to generate descrambled data, and wherein said descrambling means is operatively coupled with said transmitting means for conveying said descrambled data to said transmitting means and wherein said transmitting means transmits said descrambled data.

6. An apparatus for generating an encrypted confirmation as recited in claim 5 wherein said input means receives clear data and wherein said scrambling means receives said clear data from said input means and scrambles said clear data responsive to said second predetermined digital code to generate said scrambled data, and wherein said scrambling means is operatively coupled with said storage means, said scrambling means storing said scrambled data in said storage means.

7. An apparatus for generating an encrypted confirmation as recited in claim 6 wherein said telecommunication system comprises a wireless telephony system and said clear encryption key comprises an account number.

8. An apparatus for generating an encrypted confirmation as recited in claim 2 wherein the apparatus further comprises processing means for executing program instructions for controlling said local unit and program memory means coupled with said processing means for storing a predetermined number of said program instructions.

9. An apparatus for generating an encrypted confirmation as recited in claim 8 wherein said descrambling means comprises a first plurality of program instructions of said predetermined number of program instructions and said scrambling means comprises a second plurality or program instructions of said predetermined number of program instructions.

10. An apparatus for generating an encrypted confirmation as recited in claim 9 wherein said processing means and said program memory means are coupled by a bus means for communicating said program instructions and said descrambled encryption key.

11. An apparatus for generating an encrypted confirmation as recited in claim 10 wherein said processing means, said program memory means and said bus means are integrated in a single integrated circuit, said single integrated circuit having output means coupled with said bus means for coupling said common bus with said memory means.

12. An apparatus for generating an encrypted confirmation as recited in claim 11 wherein said processing means includes a control output and wherein the apparatus further comprises latch means coupled intermediate said bus means and said output means, said latch means having a control input coupled with said control output, said processing means providing a control signal to said latch means for selectively decoupling said common bus from said output means responsive to said control signal.

13. An apparatus for generating an encrypted confirmation as recited in claim 12 wherein said processing means provides said control signal to said latch means for decoupling said output means from said common bus when said common bus communicates said descrambled encryption key.

14. An apparatus for generating an encrypted confirmation as recited in claim 12 wherein said processing means provides said control signal to said latch means for decoupling said output means from said common bus when said processing means executes said first plurality of program instructions.

15. An apparatus for generating an encrypted confirmation as recited in claim 14 wherein said code means comprises a programmable digital encoder for producing a multiple-bit digital signal.

16. An apparatus for generating an encrypted confirmation as recited in claim 15 wherein said programmable digital encoder comprises a fuse bank.

17. A method for use in a telecommunication system, said telecommunication system including a local unit and a remote unit, the method being for generating an encrypted confirmation in said local unit responsive to an inquiry received from said remote unit, the method comprising the steps of:

providing memory means for storing a scrambled encryption key;

receiving said inquiry from said remote unit;

receiving said scrambled encryption key from said memory means;

descrambling said scrambled encryption key responsive to a predetermined digital code to produce a descrambled encryption key;

generating said encrypted confirmation in response to said inquiry, said encrypted confirmation being generated using at least a portion of said inquiry and said descrambled encryption key; and transmitting said encrypted confirmation.

18. A method for use in a telecommunication system, said telecommunication system including a local unit and a remote unit, the method being for generating an encrypted confirmation in said local unit responsive to an inquiry received from said remote unit, the method comprising the steps of:

providing memory means for storing a scrambled encryption key;

receiving said inquiry from said remote unit;

receiving said scrambled encryption key from said memory means;

descrambling said scrambled encryption key responsive to a predetermined digital code to produce a descrambled encryption key;

generating said encrypted confirmation in response to said inquiry, said encrypted confirmation being generated using at least a portion of said inquiry and said descrambled encryption key;

transmitting said encrypted confirmation; and providing code means for establishing said predetermined digital code, wherein said scrambled encryption key is descrambled responsive to said predetermined digital code.

19. A method for generating an encrypted confirmation as recited in claim 18 wherein the method further comprises the steps of receiving a clear encryption key, scrambling said clear encryption key to produce said scrambled encryption key and storing said scrambled encryption key in said memory means prior to receiving said inquiry.

20. A method for generating an encrypted confirmation as recited in claim 19 wherein said clear encryption key is scrambled in response to said predetermined digital code.

21. A method for generating an encrypted confirmation as recited in claim 19 wherein said clear encryption key is scrambled in a first integrated circuit, said scrambled encryption key is descrambled in said first integrated circuit, said memory means is provided in a second integrated circuit, and wherein the method further comprises the step of providing within said first integrated circuit bus means for communicating said scrambled encryption key and said clear encryption key and output means for coupling said bus means to said memory means.

22. A method for generating an encrypted confirmation as recited in claim 21 wherein the method further comprises the step of decoupling said output means from said bus means when said scrambled encryption key is descrambled.

23. A method for generating an encrypted confirmation as recited in claim 21 wherein the method further comprises the step of decoupling said output means from said bus means when said bus means communicates said descrambled encryption key.

* * * * *